Patented Jan. 27, 1942

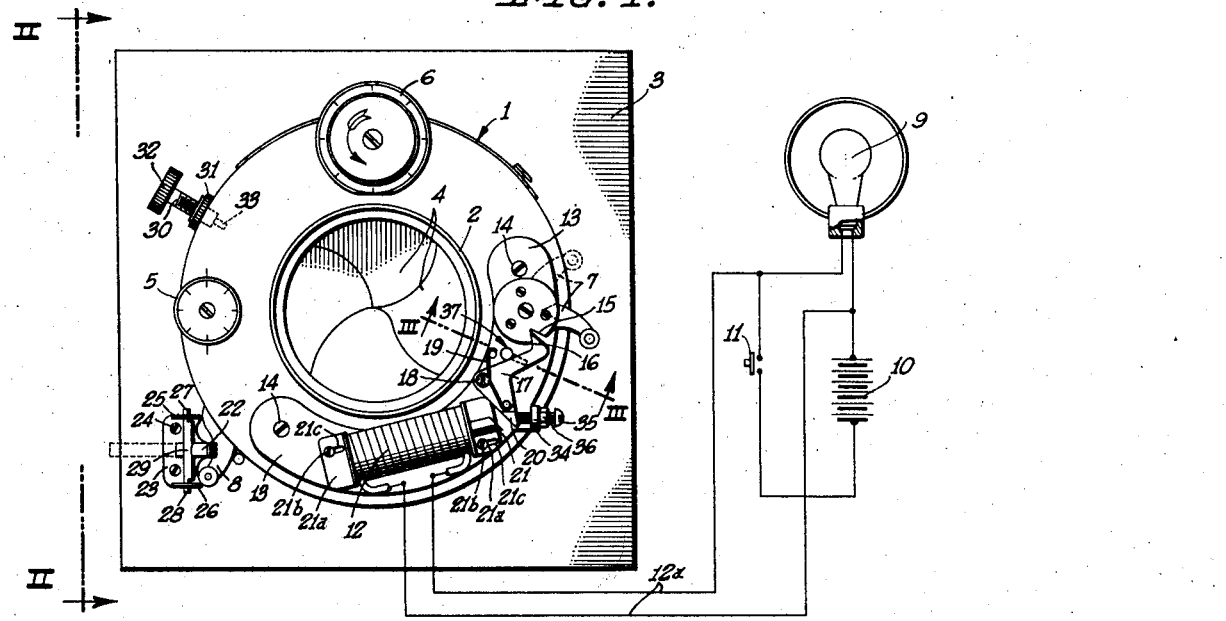

2,271,340

UNITED STATES PATENT OFFICE 2,271,340

SHUTTER AND FLASH SYNCHRONIZER FOR CAMERAS

Irving Jacobson, Los Angeles, Calif., assignor to The Folmer Graflex Corporation, Rochester, N. Y., a corporation of Delaware Application June 19, 1939, Serial No. 279,922

10 Claims. (Cl. 67—29)

My invention relates to devices for synchronizing the operation of the shutter of a camera with the firing of a flash lamp and has particular reference to a device of this character which, when placed upon the camera, will insure the opening of the shutter at the instant of maximum brilliancy of the flash lamp and finding particular utility when applied to cameras employing between-the-lens shutters of the type commonly referred to as "Compur."

In making flash light photographs, it is common practice to employ an electrically fired flash lamp usually constructed as a glass envelope having a base thereon adapted to be received in a socket providing electrical connection with the firing elements contained within the flash lamp. The maximum brilliancy or light intensity of the flash lamp is attained at a substantial time lag after current is supplied to the firing elements thereof and it is at this instant of maximum brilliancy that the shutter of the camera should be opened in order that the maximum light intensity should register on the film. In order to synchronize the opening of the shutter with the attainment of the maximum intensity of the flash lamp, various devices have been suggested for automatically opening the shutter at the desired instant.

My previous United States Patent No. 2,161,355, issued June 6, 1939 discloses a novel type of shutter actuating mechanism which may be so adjusted when connected in circuit with a photo flash lamp as to open the camera shutter at the instant of maximum brilliancy of the flash lamp. The particular device disclosed in the above noted patent is arranged to operate the camera shutter by actuating the shutter trigger in precisely the same manner as the shutter is actuated when controlled by hand. While this device achieves excellent results, it has been recently discovered that it is difficult to maintain this device in accurate adjustment when it is employed upon between-the-lens shutters of the "Compur" type which employ a main spring and a cocking mechanism for said spring which is independent of the shutter trigger.

This type of "Compur" shutter employs a relatively strong main spring for actuating the shutter leaves, this spring being cocked prior to actuation of the shutter by the rotation of a cocking lever provided for that purpose. The shutter trigger is connected to the main spring and shutter leaves by relatively complicated system of levers and linkages so that the amount of movement which must be imparted to the shutter trigger in order to actuate the shutter mechanism varies with the amount of wear to which this multiplicity of connections is subjected.

It has been found that the synchronization between shutter actuation and the firing of a photo flash lamp when an actuating device of the character described in the above noted patent is used varies appreciably with relatively small amounts of wear in the linkages connecting the shutter trigger to the shutter main spring.

It is accordingly an object of the present invention to overcome the above noted disadvantages by providing a shutter actuating device for flash lamp synchronization which acts directly upon the main spring of the shutter mechanism and independently of the linkages connecting the shutter trigger to this main spring.

It is also an object of my invention to provide an electromagnetic shutter actuating mechanism and means for connecting this mechanism directly to the main spring of a shutter mechanism to provide for accurate synchronism between the actuation of the shutter and the firing of a photo flash lamp independently of wear of linkages associated with the shutter actuating trigger.

It is also an object of my invention to provide a photo flash lamp and camera shutter synchronizing device of the character set forth in the preceding paragraph which includes means for restraining a camera shutter main spring after the shutter trigger is actuated and which is actuatable to release said main spring.

It is a further object of my invention to provide a device of the character set forth in the preceding paragraph in which the time of actuation of the shutter leaves relative to the time of energization of the actuating mechanism may be manually adjusted.

It is also an object of my invention to provide a photo flash lamp and camera shutter synchronizing mechanism of the character set forth in the preceding paragraphs which includes means for engaging the cocking lever or member of the shutter main spring to hold said lever or member in the cocked position after the shutter trigger is actuated and which includes also means for releasing said cocking mechanism a predetermined time after the circuit to a photo flash lamp is completed.

Other objects and advantages of my invention will be apparent from a study of the following specifications, read in connection with the accompanying drawing, wherein:

Fig. 1 is an elevational view illustrating the synchronizing mechanism of my invention as applied to a well known form of "Compur" shutter, together with the electrical connections employed therewith illustrated diagrammatically;

Fig. 2 is an elevational view taken substantially as indicated by the line II—II in Fig. 1 to illustrate the relationship between the shutter actuating trigger and the means for maintaining said trigger in the tripped position; and Fig. 3 is a fragmentary sectional view taken substantially along the line III—III of Fig. 1 showing the construction of one form of "hold-out" device which may be employed to permit the use of the shutter independently of the synchronizing mechanism.

Referring to the drawing, I have illustrated in Fig. 1 a well known form of camera lens and shutter mechanism 1 to which the preferred form of shutter actuating device of my invention is attached. The camera lens and shutter mechanism 1 may include a multiple element lens, the individual elements of which are mounted upon the lens carrier 2 which is in turn secured to a lens board 3 adapted to be removably secured to the front of any of various types of cameras.

The lens carrier 2 provides an interior mounting space for housing the various shutter mechanisms employed for actuating a plurality of shutter leaves 4 which are normally disposed between a pair of lens elements. The lens carrier 2 in addition to housing the shutter mechanism, supports a selector disk 5 which may be used to set the shutter mechanism for instantaneous, time or bulb exposures and a shutter time controlling device 6 which operates to permit adjustment of the time of exposure obtained on "instantaneous" exposures.

A cocking lever, member or means 7 is provided which is coupled to a main spring (not shown) carried within the housing portion of the lens carrier 2. The main spring is connected to the shutter leaves 4 in such manner that actuation of a shutter tripping lever 8 will cause these leaves to separate and permit passage of light through the camera lens.

All of the devices described up to this point constitute standard lens and "Compur" shutter constructions. In using the shutter for the taking of instantaneous exposures, the selector wheel 5 is set to the "instantaneous" setting, the speed adjusting wheel 6 is set to the desired time of exposure, the cocking lever or member 7 is moved from an uncocked position, such as illustrated by dotted lines in Fig. 1, to a cocked position as indicated by solid lines in Fig. 1, and then the shutter trigger 8 is moved to a tripping position as illustrated in Fig. 1 for the purpose of permitting the cocked main spring (not shown) to actuate the shutter leaves and effect exposure of the film carried in the camera.

In order to take instantaneous flash lamp exposures, it is necessary to energize a photo flash lamp 9 and at a subsequent time open the shutter leaves 4 so as to effect the opening thereof at the time the photo flash lamp 9 has attained maximum brilliancy. For this purpose I connect the photo flash lamp 9 in series circuit with a battery 10 or other suitable source of electrical energy and a momentary contact switch 11 so that closure of the switch 11 will supply firing energy to the flash lamp 9. In order that the camera shutter may likewise be actuated in response to the closing of the switch 11, I connect an electromagnet 12 in parallel with the photo flash lamp 9 by means of electrical conductors 12a and mechanically connect the electromagnet 12 with the camera shutter mechanism.

I prefer to provide an arcuate plate 13 which may be removably secured as by screws 14 to the lens carrier 2 and which is adapted to support the electro-magnet 12 and suitable coupling mechanism cooperating with the cocking lever or member 7. The cocking lever or member 7 is preferably modified to the extent that a V-shaped notch 15 is provided in the periphery of the hub thereof in a position to be engaged by a nose 16 of a pivotally supported pawl 17. The pawl 17 may be supported for pivotal movement upon the plate 13 by means of a screw or other suitable pivot member 18. A spring member 19 is coupled between the pawl 17 and the plate 13 so as to normally urge the nose 16 into engagement with the notch 15 formed in the hub of the cocking lever. The pawl 17 and the electromagnet 12 are preferably disposed in such positions relative to each other upon the arcuate plate 13 as to position a tail-piece or armature 20 of the pawl 17 in a position closely adjacent the end of a pole-piece or plunger 21 of the electromagnet 12.

A convenient way of mounting the electromagnet 12 upon the supporting plate 13 is to employ angle brackets 21a secured to the ends of the magnet 12 and secured to the plate 13 by screws 21b. The screws 21b are preferably passed through slots 21c in the angle brackets 21a so that the magnet 12 may be moved toward and away from the armature 20 to adjust the spacing of the pole-piece or plunger 21 relative thereto.

It will be observed that should the cocking lever or member 7 be moved from the normal position, as indicated by dotted lines in Fig. 1, to the cocked position, as shown in the full lines, the spring 19 will urge the nose 16 of the pawl into engagement with the notch 15 to restrain the cocking lever or member 7 in its cocked position. It will be further noted that the pawl will operate to maintain the cocking lever or member in this cocked position even though the shutter tripping lever 8 be tripped, and that energization of the electromagnet 12 will attract the armature 20 toward the pole-piece or plunger 21 to effect the removal of the nose 16 from the notch 15 and allow the cocking lever or member 7 to return to the normal position. The return of the cocking lever or member 7 to the normal position effects actuation of the shutter leaves in precisely the same manner as would normal tripping of the shutter trigger 8.

I prefer to provide means for normally holding the shutter trigger 8 (which, in conventional constructions, is returned to its normal position by a spring) in its tripped position. This means may include a blocking member 22 which is mounted for pivotal movement about a horizontal axis from a blocking position, as is illustrated in solid lines in Fig. 1, to a non-blocking position, as illustrated in dotted lines. A convenient way of thus mounting the blocking member 22 includes the provision of a plate-like base member 23 which may be secured to the lens board 3 as by screws 24 and which provides a pair of ears 25 and 26 extending outwardly from the face of the lens board 3.

The ears 25 and 26 may be provided with aligned bores adapted to receive pins or lugs 27 and 28 formed upon the central ends of a cross bar portion 29 of the blocking member 22. It will be observed that with the blocking member in the released position, as indicated by dotted lines in Fig. 1, the shutter trigger 8 may be readily locked in its tripped position by moving the lever 8 to this position and then moving the blocking member 22 to the blocking position, as is illustrated by full lines. The force which is applied to the blocking member 22 by the tendency of the tripping lever 8 to return to its normal position occurs at right angles to the plane of movement permitted the blocking member 22 by its pivotal mounting so that it will remain in the blocking position.

Another convenient form of blocking device which may be employed is illustrated in Fig. 1 as comprising a screw 30 adapted to be threaded into the cable release receptacle 31 for ordinarily provided on "Compur" shutter mechanism. For convenience, the screw 30 is provided with a knurled head 32 so that when the screw 30 is placed in the receptacle 31 it may be screwed therein to move a pin portion 33 formed on the inward end thereof into engagement with the shutter tripping mechanism and effect actuation thereof. It will be observed that when the screw is advanced in this fashion to its extreme inward position, the shutter will be held in tripped position in the same fashion as does a standard cable release when held depressed so as to accomplish the holding of the shutter mechanism in the tripped position as effectively as does the blocking member 22 described above.

In operation, the camera shutter is cocked by moving the cocking lever or member 7 to the cocked position and then the shutter trigger 8 is moved to the tripped position and blocked therein by the blocking member 22 or 30. Normal actuation of the camera shutter is prevented by the engagement of the nose 16 of the pawl 17 with the notch 15 which is formed in the hub portion of the cocking lever or member 7. When it is desired to make the exposure, the momentary contact switch may be operated to simultaneously energize the photo flash lamp 9 and the electromagnet 12, energization of the flash lamp 9 effecting its operation to light the subject to be photographed. At the same time the energization of the electromagnet 12 starts pivotal movement of the pawl 17 about its pivotal mounting 18 to subsequently disengage the nose 16 thereof with the notch 15 to permit the return movement of the cocking lever or member 7 to its normal position and operate the shutter leaves 4.

It has been found that the time lapse occurring between the energization of the electromagnet 12 and the actual opening of the shutter leaves 4 may be readily and accurately controlled by adjusting the depth to which the nose 16 penetrates the notch 15. In order that this penetration may be adjusted and maintained fixed so as to provide the desired synchronizing of shutter actuation with the time of attainment of maximum photo flash lamp brilliancy, I provide an upstanding ear portion 34 formed on the arcuate plate 13 and threaded to receive an adjusting screw 35 which is disposed in a position engaging the tail-piece 20. Turning of the screw 35 will thus be effective in causing a pivotal movement of the pawl 17 about its pivot point 18 to vary the penetration of the nose 16 into the notch 15. I provide a lock nut 36 upon the screw 35 for locking the screw 35 in its final adjusted position.

From the foregoing, it will be observed that the shutter actuating mechanism which I have just described operates directly on the cocking lever or member of the camera shutter and the main spring (not shown) associated therewith so that wear, lost motion and faulty adjustment of the many levers and linkages which connect the tripping lever with the shutter main spring (not shown) will have no effect whatever upon the timing adjustment of the actuating mechanism.

It will also be observed that the camera shutter may be used in the normal fashion for instantaneous exposures without the aid of a photo flash lamp either by employing the electromagnet 12 as a means for actuating the shutter leaves 4 or by using the tripping lever 8 in which case it is necessary that the pawl 17 be held manually in the retracted position at the time the tripping lever 8 is operated by hand. If desired, a "hold-out" device 37 may be employed on the supporting plate 13 for holding the pawl nose 16 out of engagement with the notch 15.

The hold-out 37 may be constructed as is illustrated in Fig. 3 as including a pin 38 slidably received in a slot 39 formed in the supporting plate 13 and the housing of the shutter 1. The pin 38 is preferably held against axial movement outwardly by a pin or key 40 and against inward movement by a head portion 41 which is disposed in a position to be engaged by the edge of the pawl 17. The slot 39 extends at an angle to the pawl 17 so that when the pawl 17 is retracted the hold-out 37 may be slid lengthwise along the slot 39 to bring the head portion 41 into engagement with the pawl and prevent the return of the pawl to its notch-engaging position by wedging the hold-out 37 between the pawl and the slot 39. It will be seen that this permits the shutter mechanism to operate in the normal fashion without interference by the photo flash lamp synchronizing apparatus of my invention when it is desired to take instantaneous photographs without the aid of flash lighting.

It is to be understood that the supporting plate 13 may be either the arcuate plate normally provided on this type of shutter or may be a separate plate to be added in place of or on top of the plate normally provided. Furthermore, the plate 13 may be, if desired, formed as a housing to cover and protect the actuating mechanism.

While I have shown and described the preferred embodiment of my invention, I do not desire to be limited to any of the details of construction shown or described herein, except as defined in the appended claims.

I claim:

1. In a device for controlling the actuation of a camera shutter which has a main spring releasable to actuate said shutter, a cocking member for said main spring, a trigger, and coupling means coupling said trigger to said main spring and responsive to movement of said trigger to shutter actuating position to effect release of said main spring, the combination of restraining means engaged with said main spring cocking member independently of said coupling means for restraining said main spring after said trigger is moved to shutter actuating position; electromagnet means coupled to disengage said restraining means from said main spring cocking member upon change in the electrical condition of said electromagnetic means, and means to vary the extent of engagement of said restraining means with said main spring cocking member, to effect synchronizing of shutter action with the time of attainment of maximum photo-flash lamp brilliancy.

2. In a device for regulating the lapse of time between the energization of an electric circuit and the actuation of a camera shutter which has a main spring releasable to actuate said shutter, a cocking member for said main spring, a trigger, and coupling means coupling said trigger to said main spring and responsive to movement of said trigger to shutter actuating position to effect release of said main spring;—a shutter actuation control device comprising restraining means engaged with said main spring cocking member independently of said coupling means for restraining said main spring after said trigger is moved to shutter actuating position; an electromagnetic means coupled to disengage said restraining means from said main spring cocking member when energized; means connecting said electromagnetic means to said electric circuit for energization therewith; and means coacting with said restraining means for regulating the lapse of time between energization of said electromagnetic means and the actuation of said shutter.

3. In a device for regulating the lapse of time between the energization of an electric circuit and the actuation of a camera shutter which has a main spring releasable to actuate the shutter, a cocking member for said main spring, a cocking lever for cocking said main spring, a trigger, and a coupling means coupling said trigger to said main spring and responsive to movement of said trigger to shutter actuating position to effect release of said main spring;—a shutter actuation control device comprising restraining means engaged with said cocking lever independently of said coupling means for restraining said cocking lever after said trigger is moved to shutter actuating position; an electromagnetic means coupled to disengage said restraining means from said cocking lever when energized; means connecting said electromagnetic means to said electric circuit for energization therewith; and means coacting with said restraining means for regulating the lapse of time between the energization of said electromagnetic means and the actuation of said shutter.

4. In a device for regulating the lapse of time between the energization of an electric circuit and the actuation of a camera shutter which has a main spring releasable to actuate said shutter, a cocking member for said main spring, a cocking lever for cocking said main spring and including a hub portion and a trigger movable to a shutter actuating position to effect release of said main spring;—a shutter actuation control device comprising a notch formed in the periphery of said cocking lever hub; a pawl having a nose portion engageable with said notch; means pivotally mounting said pawl for movement from a restraining position with said nose engaging said notch and restraining said cocking lever after said trigger is moved to shutter actuating position to another position disposing said nose out of engagement with said notch; an electromagnet disposed to move said pawl from said restraining position when energized; means connecting said electromagnetic means to said electric circuit for energization therewith; and means regulating the depth to which said pawl nose penetrates said notch for controlling the lapse of time between the energization of said electromagnet and the actuation of said shutter.

5. In a device for synchronizing the firing of a flash lamp with the operation of a camera shutter which has a main spring releasable to actuate the shutter, a cocking member for said main spring, a trigger, and a coupling means coupling said trigger to said shutter and responsive to movement of said trigger to shutter actuating position to release said main spring cocking member;—the combination of: a flash lamp connected in series circuit with a source of power and a switch for completing said circuit to fire said lamp; means for holding said trigger in shutter actuating position; and means for controlling actuation of said shutter in response to operation of said switch and independently of said trigger including a restraining means engaged with said main spring cocking member independently of said coupling means, an electromagnetic means connected in parallel with said flash lamp for simultaneous energization therewith, and means responsive to energization of said electromagnetic means for disengaging said restraining means from said main spring.

6. In a device for synchronizing the firing of a flash lamp with the operation of a camera shutter which has a main spring releasable to actuate the shutter, a cocking member for said main spring, a trigger, and a coupling means coupling said trigger to said shutter and responsive to movement of said trigger to shutter actuating position to release said main spring;—the combination of: a flash lamp connected in series circuit with a source of power and a switch for completing said circuit to fire said lamp; means for holding said trigger in shutter actuating position; and means for controlling actuation of said shutter in response to operation of said switch and independently of said trigger including a restraining means engaged with said main spring cocking member independently of said coupling means, an electromagnetic means connected in parallel with said flash lamp for simultaneous energization therewith, means responsive to energization of said electromagnetic means for disengaging said restraining means from said main spring cocking member, and means coacting with said restraining means for regulating the lapse of time between the energization of said electromagnetic means and the actuation of said shutter.

7. In a device for synchronizing the firing of a flash lamp with the operation of a camera shutter which has a main spring releasable to actuate said shutter, a cocking lever for cocking said main spring, a trigger, and a coupling means coupling said trigger to said main spring and responsive to movement of said trigger to shutter actuating position to effect release of said main spring;—the combination of: a flash lamp connected in series circuit with a source of power and a switch for completing said circuit to fire said lamp; means for holding said trigger in shutter actuating position; and means for controlling the actuation of said shutter in response to operation of said switch and independently of said trigger including a restraining means engaged with said cocking lever independently of said coupling means, an electromagnetic means connected in parallel with said flash lamp for simultaneous energization therewith, means responsive to energization of said electromagnetic means for disengaging said restraining means for said cocking lever, and means coacting with said restraining means for regulating the lapse of time between the energization of said electromagnetic means and the actuation of said shutter.

8. In a device for synchronizing the firing of a flash lamp with the operation of a camera shutter which has a main spring releasable to actuate said shutter, a cocking lever for cocking said main spring and including a hub portion and a trigger movable to a shutter actuating position to effect release of said main spring;— the combination of: a flash lamp connected in series circuit with a source of power and a switch for completing said circuit to fire said lamp; means for holding said trigger in shutter actuating position; and means for controlling the actuation of said shutter in response to operation of said switch and independently of said trigger including a notch formed in the periphery of said cocking lever hub, a pawl having a nose portion and pivotally mounted for movement from a restraining position with said nose engaging said notch, an electromagnet disposed adjacent said pawl and connected for simultaneous energization with said flash lamp to move said pawl from said restraining position, and means regulating the depth to which said pawl nose penetrates said notch for controlling the lapse of time between the energization of said electromagnet and the actuation of said shutter.

9. In a device for synchronizing the firing of a flash lamp with the operation of a camera shutter which has a main spring releasable to actuate said shutter, a cocking lever for cocking said main spring and including a hub portion and a trigger movable to a shutter actuating position to effect release of said main spring;— the combination of: a flash lamp connected in series circuit with a source of power and a switch for completing said circuit to fire said lamp; means for holding said trigger in shutter actuating position; and means for controlling the actuation of said shutter in response to operation of said switch and independently of said trigger including a supporting plate secured to said camera adjacent said cocking lever, a notch formed in the periphery of said cocking lever hub, an L-shaped spring pressed pawl having a nose portion formed on one of the arms thereof pivotally mounted upon said plate for movement from a normal restraining position with said nose engaging said notch, an electromagnet disposed adjacent the other arm of said pawl and connected for simultaneous energization with said flash lamp to move said pawl from said restraining position, and adjusting screw means threadedly engaged with said supporting plate in a position bearing against said other arm of said pawl for regulating the depth to which said pawl nose penetrates said notch and controlling the lapse of time between the energization of said electromagnet and the actuation of said shutter.

10. In an attachment device for regulating the lapse of time between the energization of an electric circuit and the actuation of a camera shutter which has a shutter housing, a main spring in said housing releasable to actuate said shutter, a cocking lever carried by said housing for cocking said main spring, and a trigger on said housing movable to a shutter actuating position to effect release of said main spring;—a shutter actuation control device comprising a supporting plate including means for detachably securing said plate to said shutter housing; a restraining means carried by said supporting plate in a position to engage said cocking lever and restrain said cocking lever after said trigger is moved to shutter actuating position; an electromagnetic means carried by said supporting plate and coupled to disengage said restraining means from said cocking lever when energized; means connecting said electromagnetic means to said electric circuit for energization therewith; and means coacting with said restraining means for regulating the lapse of time between the energization of said electromagnetic means and the actuation of said shutter.

IRVING JACOBSON.